March 7, 1933.  L. R. KOENIG ET AL  1,900,651
MASK
Filed Oct. 19, 1931  3 Sheets-Sheet 1
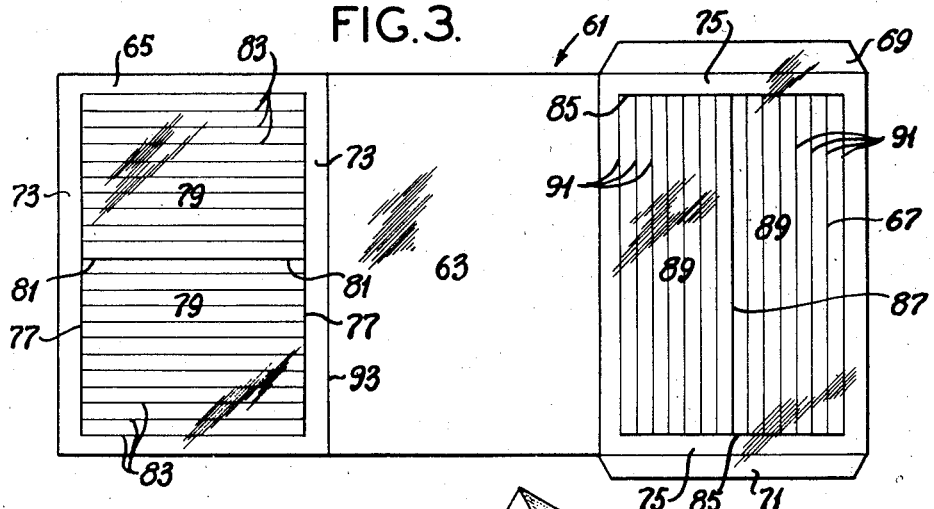
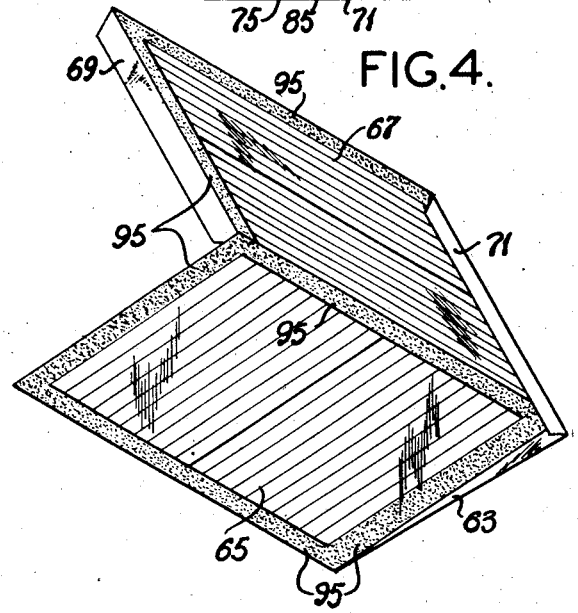
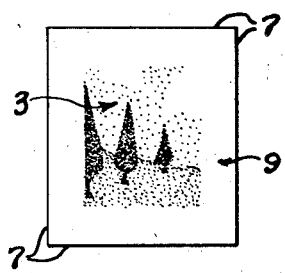
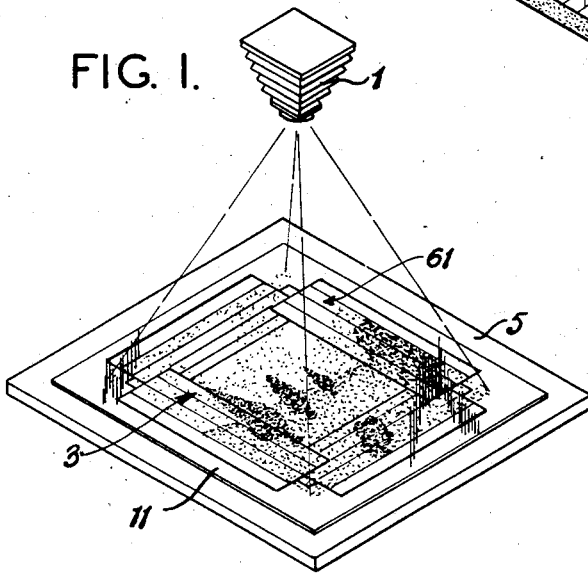
Lloyd R. Koenig,
Frederick B. Wolf,
Inventors

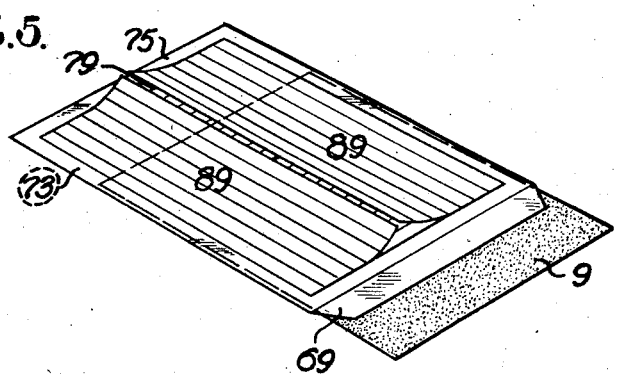
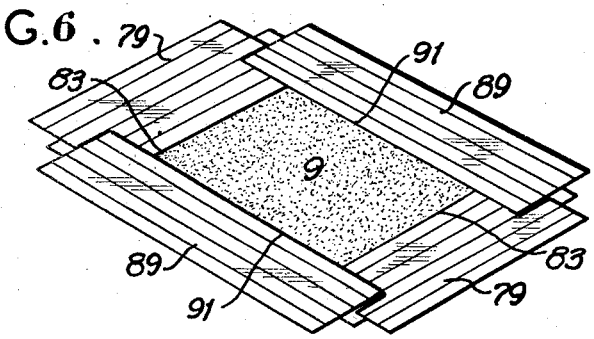
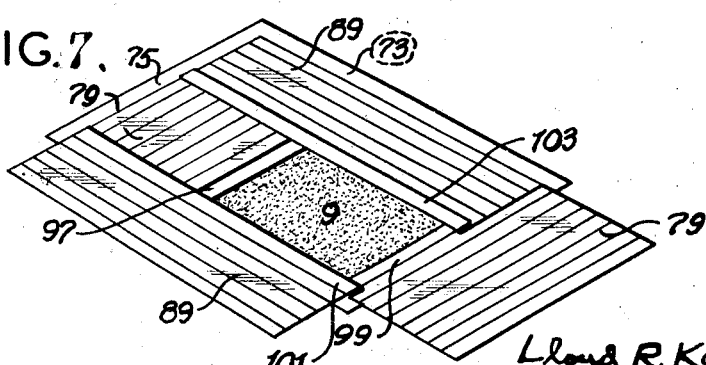

March 7, 1933.  L. R. KOENIG ET AL  1,900,651
MASK
Filed Oct. 19, 1931   3 Sheets-Sheet 3
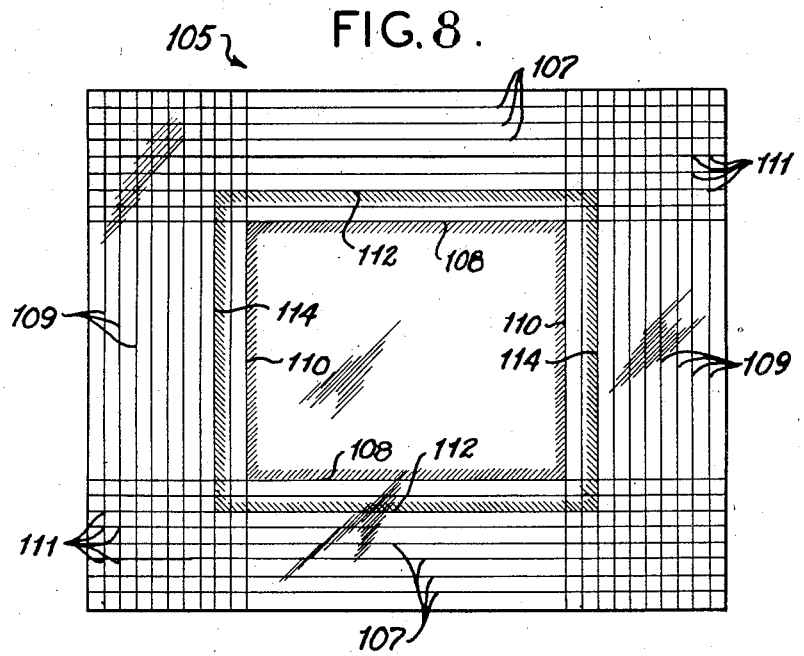
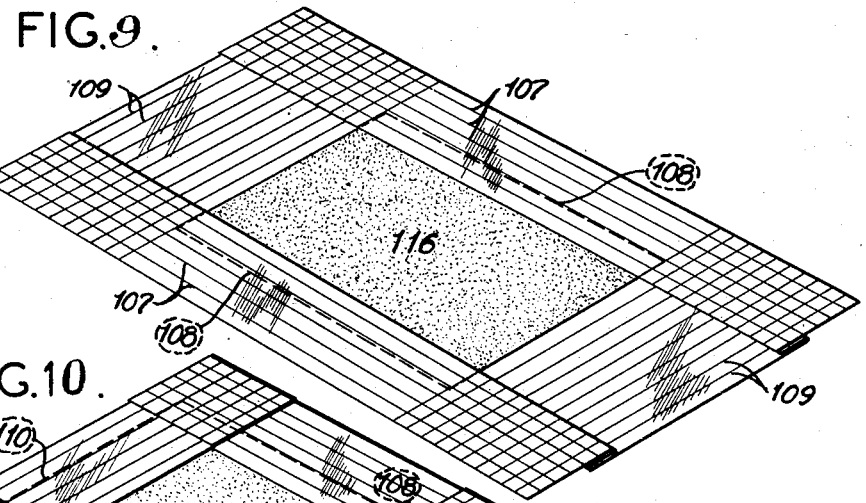
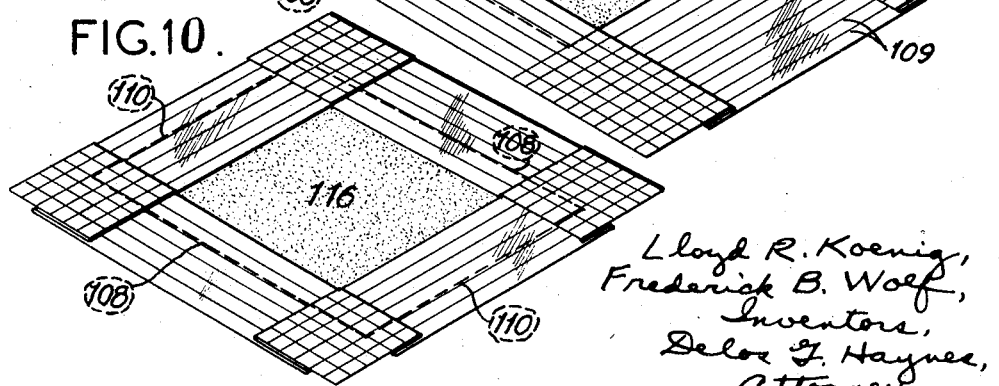

Patented Mar. 7, 1933

1,900,651

UNITED STATES PATENT OFFICE

LLOYD R. KOENIG, OF WEBSTER GROVES, AND FREDERICK B. WOLF, OF CLAYTON, MISSOURI

MASK

Application filed October 19, 1931. Serial No. 569,570.

This invention relates to masks, and with regard to certain more specific features, to adjustable, photographic masks and the like.

Among the several objects of the invention may be noted the provision of a mask which ensures any one of a great number of proper predetermined relationships between the edges of a piece of paper and the edges of the picture which is to appear thereon; the provision of an article of the class described which, with quite simple elements, permits of effecting a large number of desired combinations; the provision of a photographic mask which, after preparation for an exposure, functions as a unit with the sensitized paper which is to be masked, so that the paper with its mask may be adjusted with respect to a projected beam from an enlarging camera so as to apply to the paper only desired parts of the projection; and the provision of an article of this class which may easily be made from paper or the like and which can be sold at a price which is attractive to the user and profitable to the manufacturer. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a perspective view showing the use of one form of the invention in connection with an enlarging projector;

Fig. 2 is a plan view of a developed print obtained from the projection illustrated in Fig. 1;

Fig. 3 is a plan view of a development of another form of the invention;

Fig. 4 is a perspective view showing the development of Fig. 3 with adhesive applied thereto and in the course of being folded into a position to form an envelope;

Fig. 5 is a perspective view showing the envelope resulting from the procedure illustrated in Fig. 4, said Fig. 5 showing the envelope being loaded with a piece of sensitized paper;

Fig. 6 is a view similar to Fig. 5 after the sensitized paper has been loaded and the mask adjusted for providing a resulting symmetrically arranged picture;

Fig. 7 is a view similar to Fig. 6 showing the mask arranged to effect a resulting asymmetrically arranged picture.

Fig. 8 is a development of another alternative form of the invention:

Fig. 9 is a perspective view showing a partial assembly of the Fig. 8 form; and, Fig. 10 is a view similar to Fig. 9, showing a completed assembly.

Similar reference characters indicate corresponding parts throughout the several views of the drawings.

Referring now more particularly to Fig. 1, there is diagrammatically shown at numeral 1 a projecting camera adapted to project an image 3 toward a table 5 or the like, said image 3 being illustrated by shaded stippling. This image 3 is projected upon sensitized paper which is held down by a glass holding plate 11 through which the projected beam passes. In making the projection it is often desirable to mask out part of image and at the same time place the image in a predetermined, desirable location with respect to the edges 7 of the sheet 9 of sensitized paper (see Fig. 2).

Several difficulties enter into the problem when the ordinary masks are used. One of these is that a great number of masks are required, unless a mechanical masking machine is used, and the latter is expensive. Second, granting that a desirable shape of mask is available, it is difficult to obtain a proper relationship between the edges 7 of the sensitized paper 9 and the edges of the opening in the mask, because the sensitized paper is located behind the quite often opaque masks, and even though the mask is translucent, it is difficult to judge or place by measurement the two relatively movable pieces. The tendency of sensitized paper to curl at the edges multiplies the difficulties. Third, the ordinary methods of masking do not provide a light, flat, integral structure of which the sensitized paper and the mask are a part and which after assembly of the paper and mask may be moved about to adjust the exposed area of paper to the proper part of the projection from the camera.

We overcome all of the above objections and futhermore provide a device which maintains a sharp line of demarcation between the projected picture 5 and the blank margin thereabout.

The present invention provides a unit in which the sensitized paper is definitely positioned in the mask with its edges in a predetermined relationship with respect to the resulting opening for receiving the projected image, this being done by the guiding action of the corners of the mask. Also, the unit may be taken as a whole and laid down on the projecting board 3 and adjusted to the desired positioning of the opening with respect to the image 5. The glass 11 is then applied to hold the positioning desired.

After the projection has been made, the envelopes are unloaded, the paper developed and the result is shown in Fig. 2. The margins of the mask, which is generally similar to an envelope, function in connection with the backs of the mask as accurate aligning guides. No thumb tacks, paste, strips, or other extraneous paraphernalia are necessary and the saving in time in arranging the masks is considerable.

In Figs. 3 to 7 is shown a preferred form of the invention, embodying the above principles in a single envelope which is adapted to be manufactured from a single blank, thus cutting down the expense. The embodiment shown in Figs. 3 to 7 has the added advantage of being adapted to effect symmetrical or asymmetrical predetermined positioning of the picture on the sensitized paper.

Referring to said Figs. 3 to 7, numeral 61 refers to a development made from a suitable material adapted to be creased and scored and folded, such as a heavy weight paper or light cardboard, either plain or backed by suitable cloth webbing attached thereto and preferably opaque to light rays.

The development 61 comprises a central panel 63 which is adapted later to form the back of the envelope which is to result from the development. The development also comprises side panels 65 and 67, the latter panel carrying an upper flap 69 and a lower tongue 71.

In accordance with the teachings above made herein, the panel 65 is provided with fixed minimum sideward margins 73 and the panel 67 is provided with fixed endwise, minimum margins 75.

The margins 73 of the panel 65 are relieved from the central portion of the panel by means of incisions 77, the central portion of the panel 65 then comprising two adjustable marginal flaps 79 which are relieved from one another by an incision 81, said incision 81 connecting the incisions 77. These adjustable marginal flaps 79 are laterally scored as indicated at numerals 83, the scoring being such as to provide means for hinging the marginal flaps at any one of the predetermined lines at which a scoring appears.

The panel 67 is arranged so that an analogous construction is effected at right angles to the one described in connection with the panel 65. To particularize, the endwise minimum margins 75 are relieved from the central portions 67 by means of incision 85, the latter being centrally connected by means of an incision 87 to form lateral marginal flaps 89 which are scored as indicated at numeral 91, the scoring 91 being at right angles to the scoring 83 on the panel 65.

The last score in the groups 83 and 91 are at minimum marginal distance from the edges of the respective panels 65 and 67 for purposes which will appear.

The panels 63, 65 and 67 are hinged to one another along score lines 93 so that, as indicated in Fig. 4, the panel 65 may be folded over against the panel 63 and then the panel 67 folded over the previously folded panel 65. At this stage, or in the Fig. 3 stage of the operation, adhesive, as indicated at numeral 95, is applied to those faces of the marginal regions which are juxtaposed so that upon folding said regions they may be attached. However, the adhesive is not permitted to position itself between the panels 65 and 63, nor to impede any hinging movement of the flaps 79 or 89, nor the relative movement of any of the parts of said flaps along the score lines 83 or 91. Adhesive is also placed on the tongue 71 which is made to enclose panels 63 and 65 and is attached to the back of said panel 63. The flap 69 is left free of adhesive.

Figs. 5 to 7 show the resulting envelope which is adapted to receive a piece of sensitized paper 9, the edges of which after insertion become positioned under the minimum marginal regions 73, 75, these acting also as guides to effect entry. If exposure is made under these conditions and the flaps 79 and 89 opened wide, a minimum symmetrical margin will be effected.

If it be desired to have a larger margin, for example that illustrated by Fig. 6, the flaps 79 are hinged along suitably chosen ones of the score lines 83, as illustrated, and the flaps 89 are likewise hinged along suitable ones of the score line 91, thus providing a margin on the sensitized paper which is not subject to the projection rays of the camera 1.

It is apparent that any one or more of the marginal scores may be used to effect an adjustment of any one or more of the sides of the pictures. In Fig. 6, the resulting picture will have endwise margins which are wider than the longitudinal margins but the picture will be symmetrically arranged on the paper.

In Fig. 7 is shown an adjustment for an asymmetrically arranged picture on the sensitized paper. According to this adjustment, one of the flaps 79 is folded short along a suitable score line, thus effecting a wide margin as indicated at numeral 97; whereas the other flap 79 is folded long, as indicated at numeral 99, so as to form a narrow endwise margin. One of the flaps 89 is folded long as indicated at numeral 101 and the other is folded short as indicated at numeral 103. It will be understood that in connection with Figs. 5 to 7, that after the adjustment to Figs. 6 and 7 are made, the loaded unit is adjusted in position under the camera and a glass plate such as 11 is desirably laid down on the envelope (see Fig. 1) with its included sensitized paper and thus maintain the assembly flat, although the glass plate 11 is not absolutely necessary with some forms of material used for the envelope.

From the above it will be seen that a great number of adjustments of margin may be made with minimum complication and with maximum accuracy in the final product.

The described embodiment of the invention has certain important advantages accruing from the fact that an asymmetric arrangement of exposure may be made. Furthermore, there is only one envelope to handle in making an exposure. This envelope has all of the characteristics of portability and adjustability after loading that the previously described form has. It also has the advantage that the number of combinations of margin lines is greatly augmented.

Figs. 8 to 10 show another modification which is adapted to accommodate various sizes of paper to be margined and having a more compact form. Fig. 8 shows the development which comprises a rectangular 105 having sets of lateral score lines 107 and sets of endwise score lines 109, the two sets of score lines crossing one another at points such as 111. The areas where the score lines cross may be eliminated, but their inclusion is advantageous from the viewpoint of simplicity and ruggedness of structure as well as providing for a plurality of sheets to be accommodated.

The interior score lines 108 and 110, indicated by hatching on the development, are adapted to fit one size of paper and the second set of score lines outward from said inner set, indicated by numerals 112, 114 and by hatching, accommodate another size of paper, and this ability to accommodate various sizes of paper may be carried out indefinitely by making each successive rectangular arrangement equal to the next size of paper which it is desired to accommodate.

The enclosing or envelope form in this embodiment is attained after the sensitized paper is applied, such as, for instance, applying the smallest size of paper 116 to the smaller hatched area. Then, as indicated in Fig. 9, the scored portion may be folded over and back to form marginal regions on the paper and then, as indicated in Fig. 10, the endwise portions may be folded over and back to complete the margin, the width of margin being as desired due to the choice of score lines available for back folding.

This form of the invention has the advantage that it comprises a single sheet of paper which, for the manufacture of the mask, needs only to be scored. It also serves the purpose of masking various sizes of paper. It may also be compactly folded into a thin sheet which may be inserted in the usual package with the sensitized paper as a substitute for the bracing cardboards and the like now used, thus serving a double function.

All of the advantages of the alignment are inherent in the above described form. Also, the features of portability and adjustability after loading as well as the feature of adjustability of margins to provide either a symmetrical or asymmetrical opening are inherent.

It is intended herein that the term "envelope" shall apply to the last-named form after it has been applied to the sheet which is to be masked.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A mask comprising at least one envelope adapted to hold a sheet which is to be masked, the edges of the envelope substantially accurately positioning the edges of said sheet, said envelope having an opening, and means associated with said envelope for varying the size of said opening, said last-named means comprising flaps adjacent to said opening and means on said flaps whereby their marginal effects may be adjusted.

2. A mask comprising an enveloping means adapted to receive a sheet, said enveloping means having an opening exposing said sheet, lateral and endwise flaps hinged adjacent to said opening and score lines on said flaps whereby they may be arranged to form adjustable marginal coverings over said sheet.

3. A mask comprising an enveloping means adapted to receive a sheet, said enveloping means having an opening exposing said sheet, lateral and endwise flaps hinged adjacent to said opening and score lines on said flaps whereby they may be arranged to form adjustable marginal coverings over said sheet, the score lines of the respective flaps intersecting one another.

4. A mask comprising an enveloping means having a back, foldable portions on said enveloping means adapted to accommodate various sizes of sheets to hold the same in predetermined positions, lateral and endwise flaps associated with said foldable regions, and score lines on said flaps whereby they may be adjustably folded over said sheet.

5. A mask comprising an enveloping means adapted to be folded from an uncut rectangular sheet, said sheet having a plurality of lateral and endwise score lines, at least some of the combinations of said lateral and endwise score lines fitting predetermined sizes of paper to be masked, the remainder of the score lines being adapted to permit folding over of lateral and endwise portions of the sheet over said paper to form adjustable marginal coverings.

6. A mask comprising an enveloping sheet having a back, folded regions adapted to receive paper to be masked and align the same, lateral and endwise flaps adjacent said folded regions, said flaps being scored to permit folding over of adjustable marginal covering portions over said paper, said device comprising a preformed envelope, said envelope having minimum marginal regions adjacent said folded region adapted to function as guides for placing therein the object to the paper to be masked.

7. A photographic mask comprising enveloping means adapted to receive and form a movable unit with a sheet of sensitized paper or the like, and hold said sensitized paper in predetermined relationship to said means, and adjustable means associated with said enveloping means for covering the marginal regions of said sensitized paper, said last-named means comprising a front for said enveloping means having a central opening therein, and bendable, overlapping flaps secured to the edges of said opening.

8. A mask comprising an enveloping means adapted to receive a sheet, said enveloping means exposing a region of said sheet, and edgewise flaps associated with said enveloping means adapted to establish the confines of said exposed region, and adjusting means on the flaps adapted to vary the area of said exposed region.

In testimony whereof, we have signed our names to this specification this 17th day of October, 1931.

LLOYD R. KOENIG.
FREDERICK B. WOLF.